US012725074B2

(12) United States Patent
Ashrafzadeh et al.

(10) Patent No.: US 12,725,074 B2
(45) Date of Patent: Sep. 1, 2026

(54) ONBOARDING NEW MACHINE LEARNING APPLICATIONS IN A MULTI-TENANT ON-DEMAND MODEL SERVING INFRASTRUCTURE USING CONFIGURATION OBJECTS

(71) Applicant: Salesforce, Inc., San Francisco, CA (US)

(72) Inventors: Seyedshahin Ashrafzadeh, Foster City, CA (US); Yuliya L. Feldman, Campbell, CA (US); Alexandr Nikitin, El Sobrante, CA (US); Manoj Agarwal, Cupertino, CA (US); Chirag Rajan, Burlingame, CA (US); Swaminathan Sundaramurthy, Los Altos, CA (US)

(73) Assignee: Salesforce, Inc., San Francisco, CA (US)

( * ) Notice: Subject to any disclaimer, the term of this patent is extended or adjusted under 35 U.S.C. 154(b) by 1422 days.

(21) Appl. No.: 17/337,387

(22) Filed: Jun. 2, 2021

(65) Prior Publication Data

US 2022/0391747 A1 Dec. 8, 2022

(51) Int. Cl.

*G06N 20/00* (2019.01)
*H04L 67/12* (2022.01)

(52) U.S. Cl.

CPC .............. *G06N 20/00* (2019.01); *H04L 67/12* (2013.01)

(58) Field of Classification Search

CPC .... G06F 9/45558; G06F 9/5077; G06F 16/23; G06F 2209/501; G06F 2009/45562;

(Continued)

(56) References Cited

U.S. PATENT DOCUMENTS 7,730,478 B2 * 6/2010 Weissman ........... G06F 16/2365 717/176
8,762,329 B2 * 6/2014 Salmon ................... G06F 16/27 707/610

(Continued)

FOREIGN PATENT DOCUMENTS

CN 104142864 A * 11/2014
CN 104683365 A * 6/2015
CN 111566618 A * 8/2020 ......... G06F 9/45558

OTHER PUBLICATIONS automl.org, "AutoML . . . ", AutoML.org: Freiburg-Hannover, Available Online at <https://www.automl.org>, retrieved on Mar. 9, 2021, 1 page.

(Continued)

*Primary Examiner* — Paulinho E Smith

(74) *Attorney, Agent, or Firm* — Nicholson, De Vos, Webster & Elliott, LLP

(57) ABSTRACT

A method by a router component in a multi-tenant on-demand serving infrastructure to route scoring requests to scoring containers. The method includes receiving a scoring request, determining a machine learning application associated with the scoring request, determining whether a router instance for the machine learning application exists, and responsive to a determination that a router instance for the machine learning application does not exist, obtaining a configuration object for the machine learning application and instantiating the router instance for the machine learning application based on the configuration object for the machine learning application. The method further includes invoking the router instance for the machine learning application to route the scoring request associated with the machine learning application to a scoring container that provides scoring functionality for the machine learning application.

14 Claims, 6 Drawing Sheets

(58) Field of Classification Search
CPC .. G06F 2009/4557; G06F 2009/45575; G06N 20/00
See application file for complete search history.

(56) References Cited

U.S. PATENT DOCUMENTS 8,799,501 B2* 8/2014 Adar .................. G06F 16/9535 709/202
8,898,753 B1* 11/2014 Junod .................. G06F 21/31 713/165
8,996,610 B1* 3/2015 Sureshchandra ... G06F 16/9566 709/227
9,189,521 B2* 11/2015 Rajan .................. G06F 16/2455
9,436,837 B2* 9/2016 Shanabrook .......... G06F 21/606
9,529,626 B2* 12/2016 Wang .................. H04L 47/83
9,760,594 B2* 9/2017 Kim .................. G06F 16/285
10,108,648 B2* 10/2018 Rajan .................. G06F 16/2272
10,152,511 B2 12/2018 Rajan et al.
10,311,371 B1* 6/2019 Hotchkies ................ G06N 5/02
10,616,081 B2* 4/2020 Nataraj .................. H04L 43/06
10,650,079 B2* 5/2020 Jindal ............... G06F 15/17331
10,812,366 B1* 10/2020 Berenberg .............. H04L 45/02
11,055,273 B1* 7/2021 Meduri ............... G06F 16/2358
11,182,695 B1* 11/2021 Kirsche .................. G06N 3/088
11,461,300 B2* 10/2022 Adibowo ............ G06F 16/2255
11,853,401 B1* 12/2023 Nookula ............. G06F 18/2163
12,273,273 B2* 4/2025 Savarese ............... H04W 12/66
12,277,480 B1* 4/2025 Liberty .................. G06N 20/00
2007/0133434 A1* 6/2007 Hadders .................. H04L 45/58 370/254
2015/0007267 A1* 1/2015 Junod .................. G06F 21/42 726/3
2015/0100698 A1* 4/2015 Valbuena ................ H04L 47/76 709/226
2016/0117195 A1* 4/2016 Wang .................. G06F 9/5072 707/770
2016/0269318 A1* 9/2016 Su .................. H04L 47/785
2019/0108248 A1* 4/2019 Rajan .................. G06F 16/2272
2019/0109926 A1* 4/2019 Hotchkies ............... H04L 67/63
2019/0155633 A1* 5/2019 Faulhaber, Jr. .......... G06N 5/04
2019/0236191 A1* 8/2019 Petschulat ......... G06F 16/24553
2019/0306269 A1* 10/2019 Sofia .................. H04L 67/51
2020/0050968 A1* 2/2020 Lee .................. G06N 20/00
2021/0026703 A1* 1/2021 Fichtenholtz ......... G06F 9/5077
2021/0319360 A1* 10/2021 Vishnoi .................. G06N 20/00
2022/0083363 A1* 3/2022 Lewis .................. H04L 67/34
2022/0172100 A1* 6/2022 Balasubramanian .................. G06T 7/0008
2022/0179661 A1* 6/2022 Kim .................. G06F 9/445
2022/0237505 A1* 7/2022 Feldman ............. G06F 9/45558
2022/0237506 A1* 7/2022 Feldman ............. G06F 9/45558
2022/0318647 A1* 10/2022 Ashrafzadeh ............ G06N 5/04
2022/0382539 A1* 12/2022 Gumashta .............. G06N 20/00
2022/0382601 A1 12/2022 Feldman et al.
2022/0391199 A1* 12/2022 Ashrafzadeh ....... G06F 11/3476
2022/0391239 A1* 12/2022 Feldman ............... G06F 16/955
2023/0020939 A1* 1/2023 Klein .................. G06N 3/09
2023/0047761 A1* 2/2023 Wince .................. H04L 41/40
2023/0111775 A1* 4/2023 Lee .................. G06N 20/00 706/12
2023/0216914 A1* 7/2023 Kumar .................. H04L 47/83 709/226
2025/0317381 A1* 10/2025 Woodworth .......... H04L 45/123

OTHER PUBLICATIONS

Microsoft Research, "AutoML", Available Online at <https://www.microsoft.com/en-us/research/project/automl/>, retrieved on Mar. 9, 2021, 2 pages.
Nabar, Shubha, "Open Sourcing TransmogrifAI: Automated Machine Learning for Structured Data", Available Online at <https://engineering.salesforce.com/open-sourcing-transmogrifai-4e5d0e098da2>, Aug. 16, 2018, 10 pages.
Preston-Werner, T., "Semantic Versioning 2.0.0," Creative Commons ? CC BY 3.0, downloaded from https://semver.org/ on May 26, 2021, pp. 1-7.

* cited by examiner

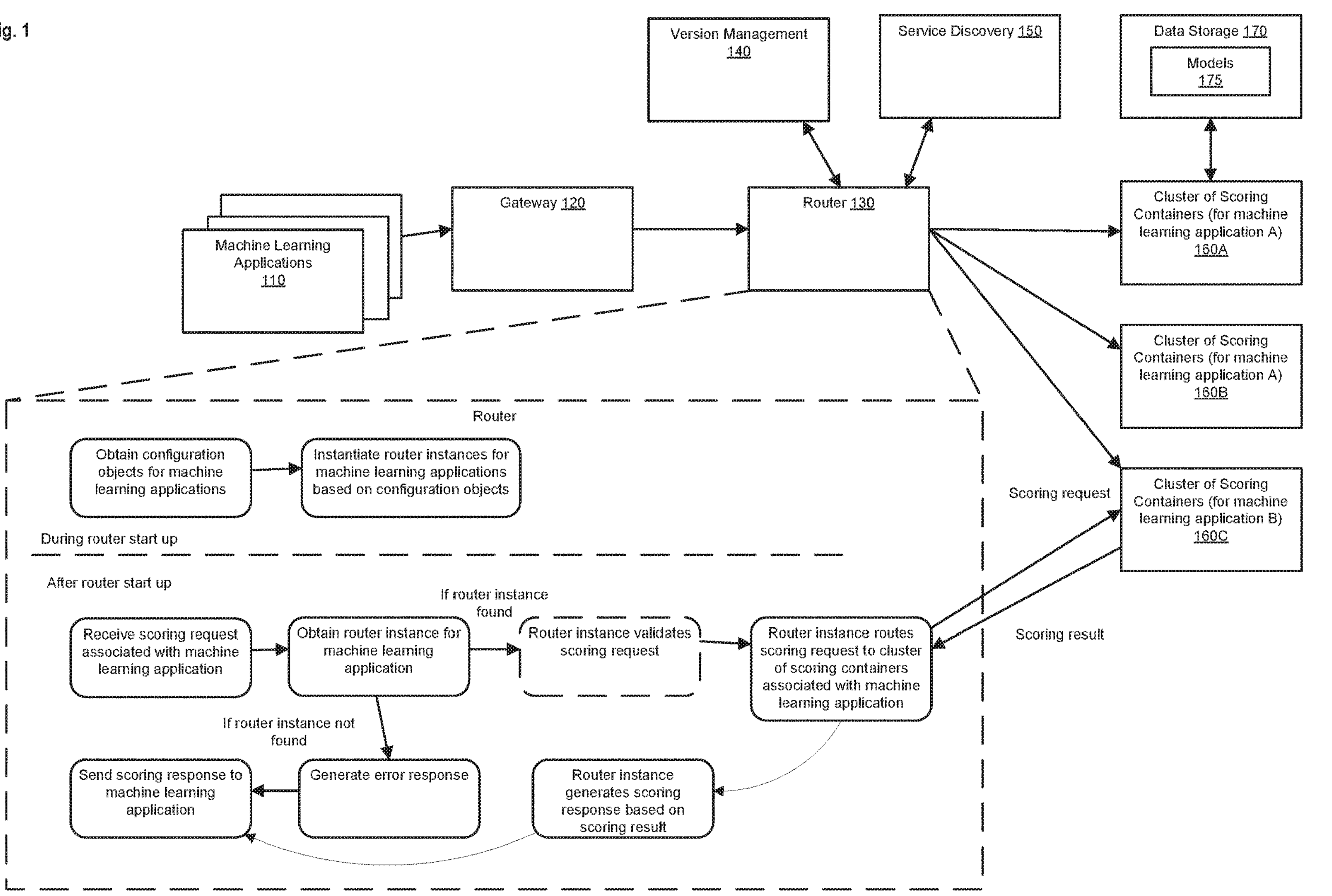
Fig. 1
Version Management 140
Service Discovery 150
Data Storage 170
Models 175
Machine Learning Applications 110
Gateway 120
Router 130
Cluster of Scoring Containers (for machine learning application A) 160A
Cluster of Scoring Containers (for machine learning application A) 160B
Cluster of Scoring Containers (for machine learning application B) 160C
Scoring request
Scoring result
Router
Obtain configuration objects for machine learning applications
Instantiate router instances for machine learning applications based on configuration objects
During router start up
After router start up
If router instance found
Receive scoring request associated with machine learning application
Obtain router instance for machine learning application
Router instance validates scoring request
Router instance routes scoring request to cluster of scoring containers associated with machine learning application
If router instance not found
Send scoring response to machine learning application
Generate error response
Router instance generates scoring response based on scoring result

Fig. 5

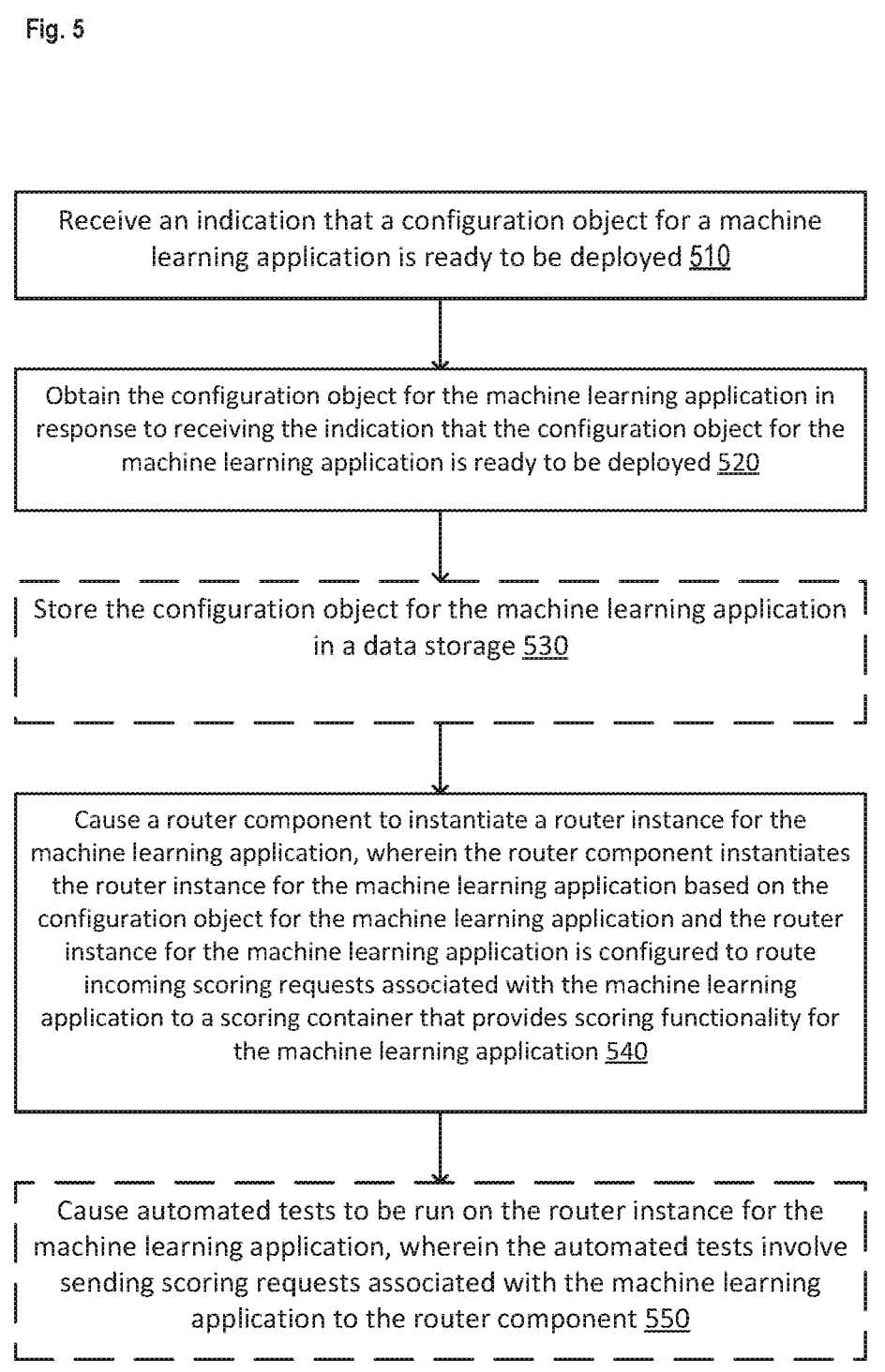

Receive an indication that a configuration object for a machine learning application is ready to be deployed 510

Obtain the configuration object for the machine learning application in response to receiving the indication that the configuration object for the machine learning application is ready to be deployed 520

Store the configuration object for the machine learning application in a data storage 530

Cause a router component to instantiate a router instance for the machine learning application, wherein the router component instantiates the router instance for the machine learning application based on the configuration object for the machine learning application and the router instance for the machine learning application is configured to route incoming scoring requests associated with the machine learning application to a scoring container that provides scoring functionality for the machine learning application 540

Cause automated tests to be run on the router instance for the machine learning application, wherein the automated tests involve sending scoring requests associated with the machine learning application to the router component 550

ONBOARDING NEW MACHINE LEARNING APPLICATIONS IN A MULTI-TENANT ON-DEMAND MODEL SERVING INFRASTRUCTURE USING CONFIGURATION OBJECTS

TECHNICAL FIELD

One or more implementations relate to the field of machine learning, and more specifically, to onboarding new machine learning applications in a multi-tenant on-demand model serving infrastructure using configuration objects.

BACKGROUND

Machine learning is a type of artificial intelligence that deals with computer algorithms that automatically improve through experience and/or by the use of data. Machine learning algorithms may build a model (also referred to as a predictive model) based on training data (also referred to as sample data) to make predictions or decisions without being explicitly programmed to do so. A model may be a representation of what a machine learning algorithm has learned after analyzing training data. Machine learning algorithms are used in a wide variety of applications such as email filtering and computer vision, where it is difficult or unfeasible to develop conventional algorithms to perform the needed tasks. Machine learning algorithms are also used in customer relationship management (CRM) systems to help make business decisions based on customer data.

Machine learning typically involves three phases: feature engineering, model training, and model serving (also referred to as predicting or inferencing). Feature engineering involves the use of domain knowledge to extract features from data that is deemed to be useful for purposes of training models. Model training involves the use of machine learning to train models based on the training data. Model serving involves receiving requests to apply the models to new (unseen) data, applying the trained models to the new data to generate scoring results (e.g., predictions or inferences), and providing the scoring results as responses to the scoring requests.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 1 is a block diagram illustrating a multi-tenant on-demand model serving infrastructure, according to some example implementations.

FIG. 5 is a flow diagram illustrating a process for managing deployment of a configuration object for a machine learning application in a multi-tenant on-demand model serving infrastructure, according to some example implementations.

DETAILED DESCRIPTION

Figure 2:
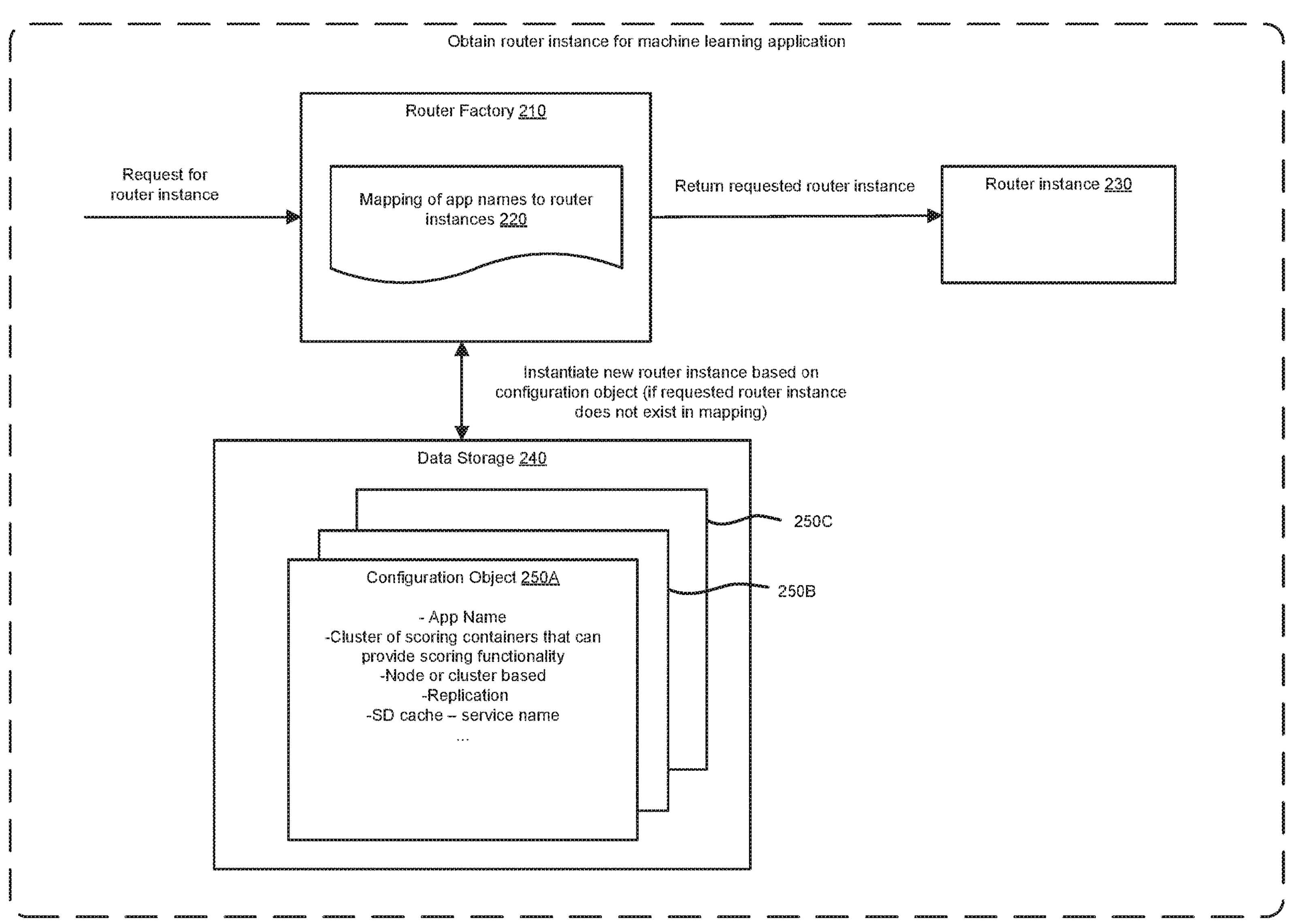
FIG. 2 is a diagram illustrating details of how to obtain a router instance for a machine learning application, according to some example implementations.

The following description describes implementations for onboarding new machine learning applications in a multi-tenant on-demand model serving infrastructure using configuration objects, and in particular to configuring a routing component of the multi-tenant on-demand model serving infrastructure to support new machine learning applications using configuration objects.

A multi-tenant on-demand model serving infrastructure (simply referred to herein as a serving infrastructure) may provide a scoring service that serves models for multiple tenants on demand A tenant may be a group of users who are part of a common organization or share common access privileges to the multi-tenant system and the associated software applications.

The serving infrastructure may include multiple scoring containers that each include a scoring library that the scoring container can use to apply models to new data to generate scoring results (e.g., predictions/inferences based on the new data). As used herein, a container is a unit of software that packages code and its dependencies so that the application runs quickly and reliably from one computing environment to another (e.g., a Docker® container). A container image is a lightweight, standalone, executable package of software that includes the resources (e.g., code, runtime, system tools, system libraries, and settings) needed to run the application. Container images become containers at runtime (e.g., when executed by a container engine). A benefit of containerizing an application is that it allows the application to run uniformly across different computing environments.

As mentioned above, each scoring container may include a scoring library that it can use to apply models to new data to generate scoring results. As used herein, a scoring library may be a collection of software resources used for providing scoring functionality. Examples of scoring libraries include AutoML®/TransmogrifAI®, TensorFlow®, and PyTorch®. Each scoring container may provide scoring functionality for a particular machine learning application or use case. In an implementation, the scoring containers are organized into clusters, where each cluster includes a group of scoring containers having the same scoring library (e.g., same type and same version of a scoring library). Each cluster of scoring containers may provide scoring functionality for one or more machine learning applications or use cases.

The serving infrastructure may include a router component that routes incoming scoring requests to the appropriate scoring container or cluster of scoring containers. In existing serving infrastructures, onboarding a new machine learning application requires code changes to the router component and other non-negligible manual efforts to accommodate the new machine learning application (e.g., to configure the router component to properly route scoring requests associated with the new machine learning application to the appropriate scoring container or cluster of scoring containers), which does not scale well.

Implementations disclosed herein may use configuration object to configure a router component to support routing for a machine learning application. A configuration object may be an object (e.g., a file or a database record) that includes relevant information for configuring the serving infrastructure to support scoring for a particular machine learning application. For example, the configuration object for a machine learning application may include the name of the machine learning application and the cluster of scoring containers that can provide scoring functionality for that machine learning application. The router component may instantiate a router instance for a machine learning application based on the configuration object for that machine learning application. The router instance for the machine learning application may be a software instance of the router component that is specifically configured to handle routing for the new machine learning application (e.g., there may be multiple router instances that are instantiations of the same class (e.g., a Java class) but have different properties). The router component may invoke the router instance for the machine learning application to route incoming scoring requests associated with that machine learning application to the appropriate cluster of scoring containers that provides scoring functionality for the machine learning application. The use of a configuration object may eliminate or at least reduce the need for manual code changes to the router component when onboarding a new machine learning application to the serving infrastructure.

An implementation is a method by one or more electronic devices implementing a router component in a multi-tenant on-demand model serving infrastructure to route scoring requests to scoring containers. The method includes receiving a scoring request, determining a machine learning application associated with the scoring request, determining whether a router instance for the machine learning application exists, responsive to a determination that the router instance for the machine learning application does not exist, obtaining a configuration object for the machine learning application and instantiating the router instance for the machine learning application based on the configuration object for the machine learning application, and invoking the router instance for the machine learning application to route the scoring request associated with the machine learning application to a scoring container that provides scoring functionality for the machine learning application.

An implementation is a method by one or more electronic devices to manage deployment of a configuration object for a machine learning application in a multi-tenant on-demand model serving infrastructure. The method includes receiving an indication that a configuration object for the machine learning application is ready to be deployed, obtaining the configuration object for the machine learning application in response to receiving the indication that the configuration object for the machine learning application is ready to be deployed, and causing a router component to instantiate a router instance for the machine learning application, wherein the router component instantiates the router instance for the machine learning application based on the configuration object for the machine learning application. The router instance for the machine learning application is configured to route incoming scoring requests associated with the machine learning application to a scoring container that provides scoring functionality for the machine learning application. Implementations will now be described with reference to the accompanying drawings.

FIG. 1 is a block diagram illustrating a multi-tenant on-demand model serving infrastructure, according to some example implementations. The multi-tenant on-demand model serving infrastructure (also referred to herein simply as a serving infrastructure) may provide a scoring service that serves models for multiple tenants on demand A model may be a representation of what a machine learning algorithm has learned after analyzing training data. The scoring service may support a large number of tenants and models (e.g., more than 10,000 models), support high volume/throughput (e.g., more than 600 scoring requests per second), and be designed to scale out to support larger numbers of tenants and/or models and higher scoring request loads. The scoring service may support multiple types of scoring libraries and multiple versions of the same scoring library. A scoring library may be a collection of software resources used for providing scoring functionality. Examples of scoring libraries include, but are not limited to, AutoML®/TransmogrifAI®, TensorFlow®, XGBoost®, and FAiss®. The scoring service may receive scoring requests from machine learning applications, apply models to new data to generate scoring results (e.g., predictions/inferences based on the new data), and provide the scoring results as scoring responses to the requesting machine learning applications.

As shown in the diagram, the serving infrastructure includes machine learning applications 110, a gateway component 120, a router component 130, a version management component 140, a service discovery component 150, a data storage component 170, and clusters of scoring containers 160A-C. Each of the components may be implemented using one or more electronic devices.

As used herein, a scoring container is a containerized application that provides scoring functionality. A scoring container may include a scoring library that can be used to apply models to data to generate scoring results (e.g., predictions/inferences). The serving infrastructure may include scoring containers supporting different types and/or versions of scoring libraries. In an implementation, the scoring containers are organized into clusters, where each cluster includes a group of scoring containers having the same scoring library (e.g., same type and same version of a scoring library). Each cluster of scoring containers may provide scoring functionality for one or more machine learning applications or use cases. For example, in the example shown in the diagram, clusters 160A and 160B may provide scoring functionality for machine learning application A, while cluster 160C provides scoring functionality for machine learning application B. Organizing scoring containers into clusters may help with ensuring high availability and low latency (e.g., scoring requests that are sent to a cluster 160 can be load balanced among the scoring containers in that cluster 160).

A scoring container may access the data storage component 170 to obtain models 175 stored therein. The scoring container may implement a caching mechanism to cache models it obtains from the data storage component 170 (e.g., in local memory) to avoid having to access the data storage component 170 every time it needs a model (e.g., which helps reduce latency). The scoring container may use any suitable cache replacement/eviction policy (e.g., least recently used) to replace/evict models in its cache.

The gateway component 120 serves as the entry point for the scoring service. The gateway component 120 may implement an API that allows the machine learning applications 110 to submit scoring requests to the scoring service. In an implementation, the gateway component 120 provides protection against bursty loads, performs Internet Protocol (IP) filtering (e.g., to only allow incoming scoring requests from known hosts), and/or performs various security-related functionality (e.g., to only allow API calls over Hypertext Transfer Protocol Secure (HTTPS)). The gateway component 120 may receive scoring requests from the machine learning applications 110 and send the scoring requests to the router component 130 to be routed to the appropriate scoring container or cluster of scoring containers 160.

The router component 130 routes incoming scoring requests to the appropriate scoring container or cluster of scoring containers 160. When the router component 130 receives a scoring request from the gateway component 120 it may consult the version management component 140 and/or the service discovery component 150 to determine which scoring container or cluster of scoring containers 160 is to provide scoring functionality for the scoring request.

The version management component 140 may keep track of information regarding which versions of scoring libraries and/or which versions of models are to be used for different tenants and/or machine learning applications 110. The router component 130 may consult the version management component 140 to determine which particular version of a scoring library and/or which particular version of a model to use to process a scoring request (e.g., depending on the tenant and/or the machine learning application 110 associated with the scoring request).

The service discovery component 150 may maintain a mapping of which scoring containers or clusters of scoring containers 160 support which tenants, scoring libraries, and/or models. The service discovery component may be implemented using a service discovery tool such as Consul® or Zookeeper®. The router component 130 may consult the service discovery component 150 to determine which scoring container or cluster of scoring containers 160 is to provide scoring functionality for the scoring request. The router component 130 may then send the scoring request to that scoring container or cluster of scoring containers 160.

A scoring container that receives a scoring request from the router component 130 may provide scoring functionality for that scoring request using its scoring library. This may involve obtaining the appropriate model (e.g., from the data storage component 170 or from its cache) and applying the model to the data indicated by the scoring request using the scoring library to generate a scoring result. The scoring container may then send the scoring result back to the router component 130, which in turn sends the scoring result back to the requesting machine learning application 110 (via the gateway component 120) as a response to the scoring request. In an implementation, the router component 130 subdivides an incoming scoring request into multiple scoring requests that are to be sent to multiple different scoring containers or clusters of scoring containers 160. In such an implementation, the router component 130 may aggregate the scoring results generated by the multiple different scoring containers or clusters of scoring containers 160 and send the aggregated scoring result back to the requesting machine learning application 110 (via the gateway component 120) as a response to the original scoring request.

As mentioned above, in existing serving infrastructures, onboarding a new machine learning application requires manual code changes to the router component and other non-negligible manual efforts to accommodate the new machine learning application (e.g., to configure the router component to properly route scoring requests associated with the new machine learning application to the appropriate scoring container or cluster of scoring containers), which does not scale well.

To address this problem, in an implementation, the router component 130 uses configuration objects to instantiate router instances for machine learning applications. A router instance for a machine learning application may be a software instance of a router component that is specifically configured to handle routing for the machine learning application in the serving infrastructure. As shown in the diagram, during startup of the router component 130, the router component 130 may obtain configuration objects for multiple different machine learning applications (e.g., from a data storage component that stores configuration objects (not shown)). For example, the router component 130 may obtain a configuration object for machine learning application A (which could be one of the machine learning applications 110) and a configuration object for machine learning application B (which could be another one of the machine learning applications 110). A configuration object may be an object (e.g., a file or a database record) that includes relevant information for configuring the serving infrastructure to support scoring for a particular machine learning application 110. In an implementation, the configuration object for a machine learning application includes the name of the machine learning application and an indication of the cluster of scoring containers 160 that can provide scoring functionality for that machine learning application. In an implementation, the configuration object is in a Javascript Object Notation (JSON) format.

Once the router component 130 obtains the configuration objects, it may instantiate router instances for each of the machine learning applications based on the configuration objects for the respective machine learning applications. For example, the router component 130 may instantiate a router instance for machine learning application A based on the configuration object for machine learning application A and instantiate a router instance for machine learning application B based on the configuration object for machine learning application B. The router instance for machine learning application A may be configured to route scoring requests to a cluster of scoring containers 160 that provides scoring functionality suitable for machine learning application A (e.g., cluster 160A or 160B), as indicated in the configuration object for machine learning application A. Similarly, the router instance for machine learning application B may be configured to route scoring requests to a cluster of scoring containers 160 that provides scoring functionality suitable for machine learning application B (e.g., cluster 160C), as indicated in the configuration object for machine learning application B.

As shown in the diagram, after startup of the router component 130, if the router component 130 receives a scoring request associated with a particular machine learning application, the router component 130 may attempt to obtain the router instance for that machine learning application. If the router component 130 is not able to find the router instance for the machine learning application, then the router component 130 may generate an error response and send it to the machine learning application as a response to the scoring request. However, if the router component 130 is able to find the router instance for the machine learning application, then the router component 130 may invoke that router instance to handle the routing of the scoring request. The invoked router instance may route the scoring request to a cluster of scoring containers 160 that provides scoring functionality for the machine learning application. In an implementation, the router instance validates the scoring request before routing the scoring request to the cluster 160. For example, if the router component 130 receives a scoring request associated with machine learning application B, the router component 130 may obtain the router instance for machine learning application B (which may have been instantiated during the startup of the router component 130 (i.e., pre-created or pre-warmed)) and invoke that router instance to handle the routing of the scoring request. The invoked router instance may validate the scoring request and route the scoring request to cluster of scoring containers 160C, which in this example is a cluster 160 that provides scoring functionality for machine learning application B.

After routing a scoring request to a cluster of scoring containers 160, the router instance may receive a corresponding scoring result (e.g., a prediction/inference) generated by the cluster 160 (e.g., based on a scoring container in the cluster 160 applying a model to data using a scoring library). The router instance may generate a scoring response based on the scoring result and send it to the requesting machine learning application 110 (e.g., via gateway component 120) as a response to the scoring request. For example, after routing the scoring request associated with machine learning application B to cluster of scoring containers 160C, the router instance may receive a corresponding scoring result generated by cluster of scoring containers 160C. The router instance may generate a scoring response based on the scoring result and send it to machine learning application B (via gateway component 120) as a response to the scoring request.

Thus, the router component 130 can be configured to support routing for different machine learning applications 110 using configuration objects, which may eliminate or at least reduce the need for manual code changes to the router component 130 when onboarding a new machine learning application to the serving infrastructure. Routing support for a new machine learning application 110 can be added to the serving infrastructure by simply creating a configuration object for the machine learning application and making it accessible to the router component 130.

FIG. 2 is a diagram illustrating details of how to obtain a router instance for a machine learning application, according to some example implementations. The diagram shows additional detail of the step of obtaining a router instance for a machine learning application shown in FIG. 1.

As shown in the diagram, a router factory 210 may maintain a mapping of machine learning application names to router instances. The router factory 210 may have access to a data storage component 240 (e.g., which may include permanent storage and cache storage on top of the permanent storage to store configuration objects that are likely to be reused) that stores configuration objects for machine learning applications (e.g., configuration objects 250A-C). A configuration object for a machine learning application may include the name of the machine learning application and an indication of the cluster of scoring containers 160 that can provide scoring functionality for that machine learning application. In an implementation, the configuration object for a machine learning application also includes other information that may be relevant for routing/scoring such as an indication of whether routing is node-based or cluster-based and an indication of a replication factor for models (e.g., if node-based routing is used).

The router component 130 may invoke the router factory 210 to obtain an existing router instance or create a new router instance. For example, the router component 130 may invoke the router factory to request a router instance for a particular machine learning application by specifying the name of the machine learning application. The router factory 210 may perform a lookup in the mapping 220 for the requested router instance using the name of the machine learning application. If the router factory 210 finds the requested router instance in the mapping 220, then it may return that router instance (as router instance 230). However, if the router factory 210 is not able to find the requested router instance in the mapping 220, then it may obtain the configuration object for the machine learning application from the data storage component 240 (e.g., using the name of the machine learning application as the key) and instantiate a router instance for the machine learning application based on the configuration object for the machine learning application and return the new router instance (as router instance 230).

In an implementation, the serving infrastructure can be updated to support a new machine learning application by creating a configuration object for the new machine learning application and storing it in the data storage component 240. The router factory 210 may obtain this configuration object from the data storage component 240 and instantiate a router instance for the new machine learning application (during startup of the router component 130 or after startup) that can be used to route scoring requests associated with the new machine learning application to the appropriate cluster of scoring containers 160.

Figure 3:
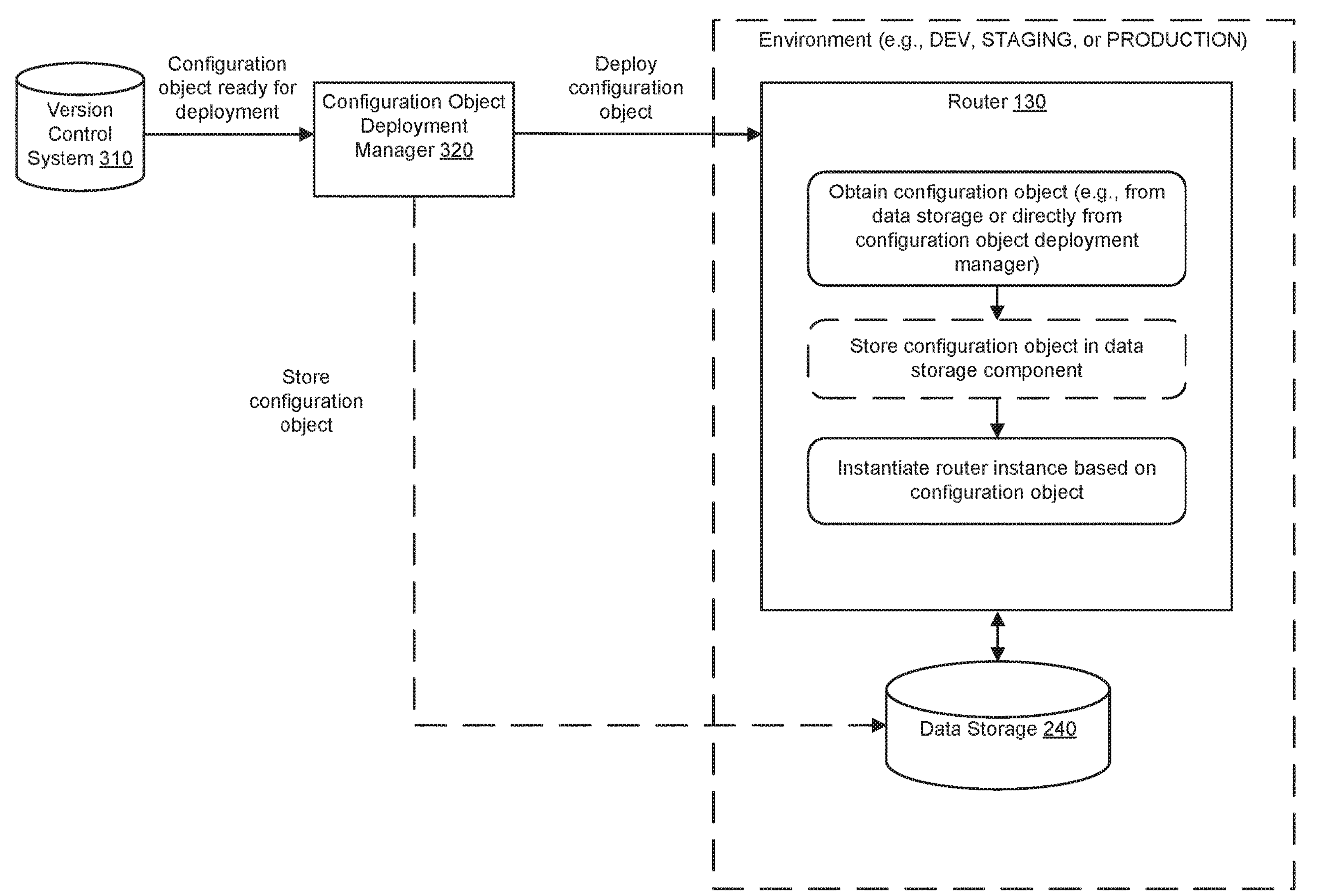
FIG. 3 is a diagram illustrating a system for managing the deployment of configuration objects, according to some example implementations.

FIG. 3 is a diagram illustrating a system for managing the deployment of configuration objects, according to some example implementations. As shown in the diagram, the system includes a version control system 310, a configuration object deployment manager 320, and a router component 130 in an environment (e.g., a development, staging, or production environment).

The version control system 310 may store configuration objects. The version control system 310 may keep track of the changes made to the configuration objects over time along with other relevant information such as who made what changes and when. Configuration objects stored in the version control system 310 may go through a review process (e.g., which may include manual review by human beings and/or automated reviews/validations). When a configuration object is deemed ready for deployment, the version control system 310 may send an indication to the configuration object deployment manager 320 indicating that the configuration object is ready to be deployed.

When the configuration object deployment manager 320 receives an indication that a configuration object is ready to be deployed, the configuration object deployment manager 320 may provide the configuration object to the router component 130 in the environment. In an implementation, the configuration object deployment manager 320 provides the configuration object to the router component 130 by storing the configuration object in a data storage component 240 in the environment and sending an indication to the router component 130 that the configuration object is now available in the data storage component 240. In an alternative implementation, the configuration object deployment manager 320 provides the configuration object to the router component 130 by sending the configuration object (or information therein) directly to the router component 130 (e.g., via an application programming interface (API) implemented by the router component 130). In an implementation, the configuration object deployment manager 320 is a continuous deployment tool such as Spinnaker®.

As shown in the diagram, the router component 130 may obtain the configuration object from the data storage component 240 or directly from the configuration object deployment manager 320 (depending on how the configuration object deployment manager 320 provides the configuration object to the router component 130). In an implementation, the router component 130 stores the configuration object in the data storage component 240 (e.g., if the router component 130 obtained the configuration object directly from the configuration object deployment manager 320). The data storage component 240 may include permanent storage that serves as the authoritative source for configuration objects in the environment and a cache storage "on top" of the permanent storage that serves as a secondary storage to store configuration objects that are more likely to be reused (e.g., the configuration objects that have been recently used). The cache storage is typically implemented using faster data storage/access technology compared to the permanent storage but is typically smaller in size. The router component 130 may instantiate a router instance based on the obtained configuration object and run automated tests on the router instance.

In an implementation, automated tests may be run on the router component 130 to test the router instance. The automated tests may involve sending scoring requests to the router component 130 that invoke the newly instantiated router instance. In an implementation, if the results of the automated tests are satisfactory, then the configuration object may be promoted to the next environment (e.g., from a development environment to a staging environment or from a staging environment to a production environment).

Figure 4:
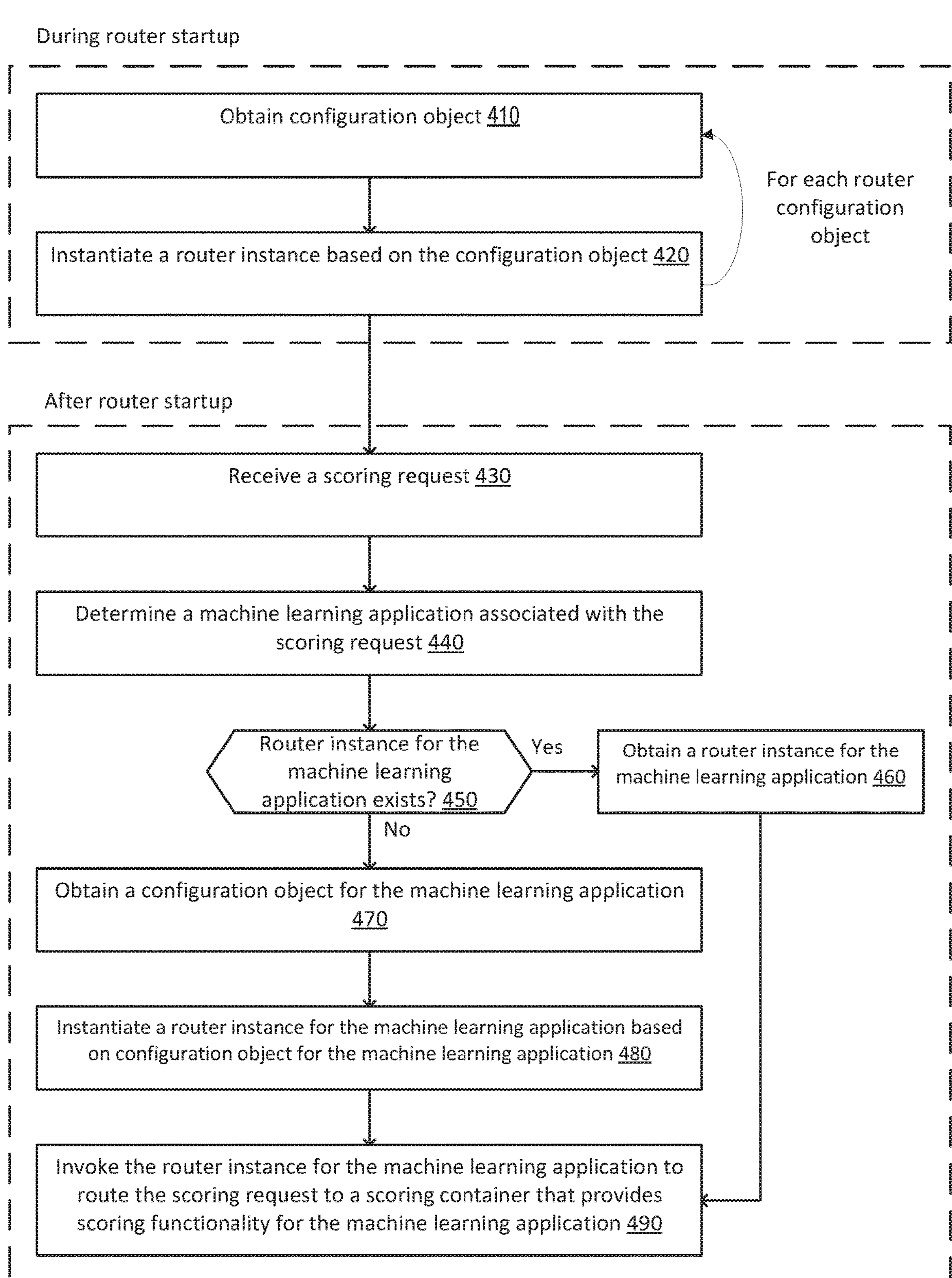
FIG. 4 is a flow diagram illustrating a process for routing scoring requests in a multi-tenant on-demand model serving infrastructure, according to some example implementations.

FIG. 4 is a flow diagram illustrating a process for routing scoring requests in a multi-tenant on-demand model serving infrastructure, according to some example implementations. In an implementation, the process is implemented by one or more electronic devices implementing a router component (e.g., router component 130) in the multi-tenant on-demand serving infrastructure.

When the router component starts up, the operations of blocks 410 and 420 may be repeated for each available configuration object.

At block 410, the router component obtains a configuration object.

At block 420, the router component instantiates a router instance based on the configuration object.

After the router component starts up, the operations of blocks 430-490 may be repeated for each scoring request that is received by the router component.

At block 430, the router component receives a scoring request.

At block 440, the router component determines a machine learning application associated with the scoring request.

At decision block 450, the router component determines whether a router instance for the machine learning application already exists. If the router instance for the machine learning application already exists, then at block 460, the router component obtains the router instance for the machine learning application and at block 490, invokes the router instance to route the scoring request to a scoring container that provides scoring functionality for the machine learning application.

Otherwise, if the router instance for the machine learning application does not exist, then at block 470, the router component obtains a configuration object for the machine learning application. In an implementation, the configuration object is obtained from a data storage component (e.g., which may include permanent storage to serve as an authoritative source for configuration objects and a cache storage to store configuration objects that are likely to be reused). In an implementation, the configuration object for the machine learning application includes a name of the machine learning application and an indication of a cluster of scoring containers that provides scoring functionality for the machine learning application.

At block 480, the router component instantiates a router instance for the machine learning application based on the configuration object for the machine learning application.

At block 490, the router component invokes the router instance for the machine learning application to route the scoring request to a scoring container that provides scoring functionality for the machine learning application. In an implementation, the router instance for the machine learning application is configured to receive a scoring result corresponding to the scoring request from the scoring container, generate a scoring response corresponding to the scoring request based on the scoring result, and send the scoring response corresponding to the scoring request to the machine learning application.

FIG. 5 is a flow diagram illustrating a process for managing deployment of a configuration object for a machine learning application in a multi-tenant on-demand model serving infrastructure, according to some example implementations. In an implementation, the process is implemented by one or more electronic devices implementing a configuration object deployment manager (e.g., configuration object deployment manager 320) in the multi-tenant on-demand model serving infrastructure.

At block 510, the configuration object deployment manager receives an indication that the configuration object for the machine learning application is ready to be deployed.

At block 520, the configuration object deployment manager obtains the configuration object for the machine learning application in response to receiving the indication that the configuration object for the machine learning application is ready to be deployed. In an implementation, the configuration object for the machine learning application includes a name of the machine learning application and an indication of a cluster of scoring containers that provides scoring functionality for the machine learning application.

In an implementation, at block 530, the configuration object deployment manager stores the configuration object for the machine learning application in a data storage component (e.g., data storage component 240). In an implementation, the configuration object deployment manager provides the configuration object for the machine learning application to a router component via an API, wherein the router component stores the configuration object for the machine learning application in a data storage component.

At block 540, the configuration object deployment manager causes the router component to instantiate a router instance for the machine learning application, wherein the router component instantiates the router instance for the machine learning application based on the configuration object for the machine learning application and the router instance for the machine learning application is configured to route incoming scoring requests associated with the machine learning application to a scoring container that provides scoring functionality for the machine learning application. In an implementation, the router component obtains the configuration object for the machine learning application from the data storage component (e.g., which may include permanent storage and cache storage, as described above).

In an implementation, at block 550, the configuration object deployment manager (or an external entity) causes automated tests to be run on the router instance for the machine learning application, wherein the automated tests involve sending scoring requests associated with the machine learning application to the router component (to invoke the router instance for the machine learning application).

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
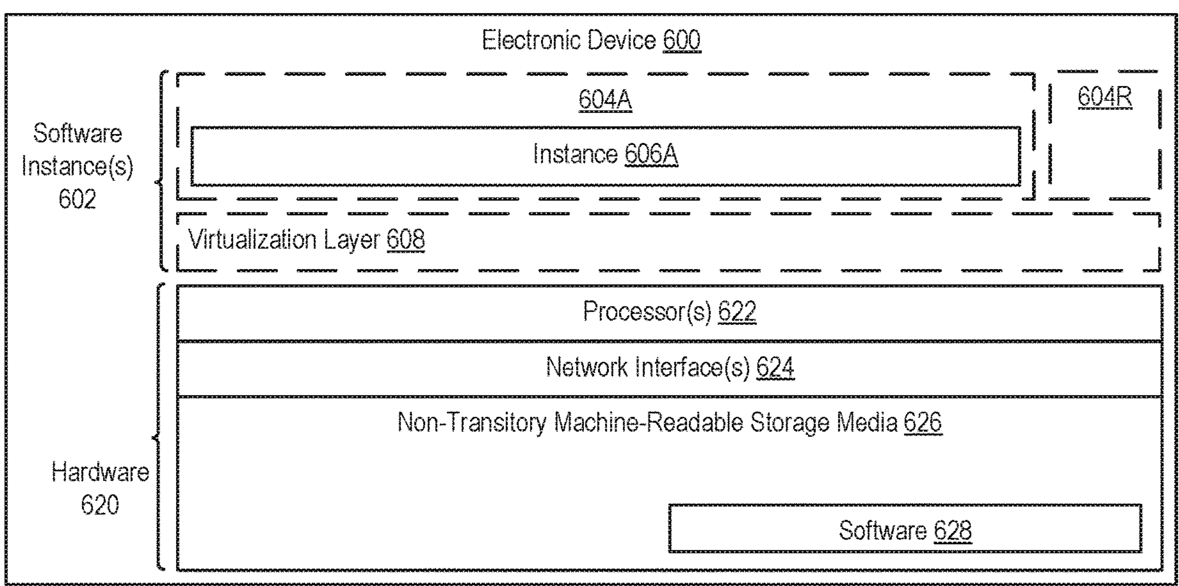
FIG. 6A is a block diagram illustrating an electronic device, according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable medium/media. Each of the previously described clients and the scoring service (e.g., including functionality of the router component 130 and/or the configuration object deployment manager 320) may be implemented in one or more electronic devices 600. In one implementation: 1) each of the clients is implemented in a separate one of the electronic devices 600 (e.g., in end user devices where the software

628 represents the software to implement clients to interface directly and/or indirectly with the scoring service (e.g., software 628 represents a web browser, a native client, a portal, a command-line interface, and/or an application programming interface (API) based upon protocols such as Simple Object Access Protocol (SOAP), Representational State Transfer (REST), etc.)); 2) the scoring service is implemented in a separate set of one or more of the electronic devices 600 (e.g., a set of one or more server devices where the software 628 represents the software to implement the scoring service); and 3) in operation, the electronic devices implementing the clients and the scoring service would be communicatively coupled (e.g., by a network) and would establish between them (or through one or more other layers and/or or other services) connections for submitting scoring requests to the scoring service and returning scoring responses to the clients. Other configurations of electronic devices may be used in other implementations (e.g., an implementation in which the client and the scoring service are implemented on a single one of electronic device 600).

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative implementations of an electronic device may have numerous variations from that described above. For example, customized hardware and/or accelerators might also be used in an electronic device.

Example Environment

Figure 6B:
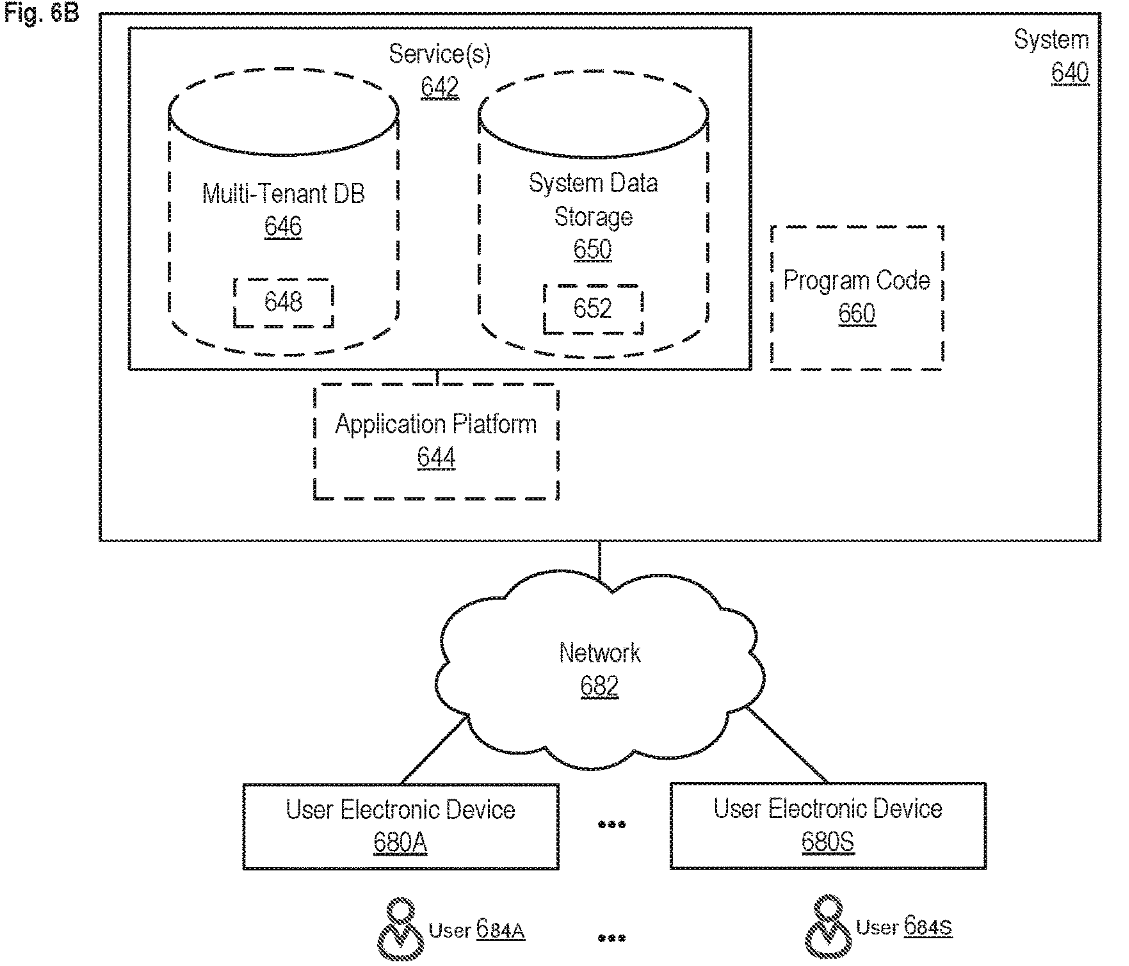
FIG. 6B is a block diagram of a deployment environment, according to some example implementations.

FIG. 6B is a block diagram of a deployment environment according to some example implementations. A system 640 includes hardware (e.g., a set of one or more server devices) and software to provide service(s) 642, including the scoring service (e.g., including functionality of the router component 130 and/or the configuration object deployment manager 320). In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-680S over a network 682. The service(s) 642 may be on-demand services that are made available to one or more of the users 684A-684S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-684S). The service(s) 642 may communicate with each other and/or with one or more of the user devices 680A-680S via one or more APIs (e.g., a REST API). In some implementations, the user devices 680A-680S are operated by users 684A-684S, and each may be operated as a client device and/or a server device. In some implementations, one or more of the user devices 680A-680S are separate ones of the electronic device 600 or include one or more features of the electronic device 600.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 640 is a multi-tenant cloud computing architecture supporting multiple services, such as one or more of the following types of services: scoring service 642 (also referred to as a machine learning inferencing service, a prediction service, an on-demand service, a machine learning service, and model serving service), Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 640 may include an application platform 644 that enables PAAS for creating, managing, and executing one or more applications developed by the provider of the application platform 644, users accessing the system 640 via one or more of user devices 680A-680S, or third-party application developers accessing the system 640 via one or more of user devices 680A-680S.

In some implementations, one or more of the service(s) 642 may use one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user devices 680A-680S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the multi-tenant database(s) 646 and/or system data storage 650.

In some implementations, the service(s) 642 are implemented using virtual applications dynamically created at run time responsive to queries from the user devices 680A-680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the scoring service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4$^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-684S to interact with various GUI pages that may be presented to the one or more of users 684A-684S. User devices 680A-680S might communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-684S of the user devices 680A-680S to access, process and view information, pages and applications available to it from system 640 over network 682.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method by one or more electronic devices implementing a router component in a multi-tenant on-demand serving infrastructure to route scoring requests to scoring containers, the method comprising:

receiving a scoring request;

determining a machine learning application associated with the scoring request;

determining whether a router instance for the machine learning application exists in the router component, wherein the router component includes a plurality of router instances for a plurality of machine learning applications, with each of the plurality of router instances being a separate instantiation of an object-oriented programming class that is specifically configured to handle routing for a different one of the plurality of machine learning applications within the multi-tenant on-demand serving infrastructure;

responsive to a determination that the router instance for the machine learning application does not exist in the router component, obtaining a configuration object for the machine learning application and creating the router instance for the machine learning application based on instantiating an instance of the object-oriented programming class with properties obtained from the configuration object for the machine learning application; and invoking the router instance for the machine learning application to route the scoring request associated with the machine learning application to a scoring container that provides scoring functionality for the machine learning application.

2. The method of claim 1, wherein the configuration object for the machine learning application includes a name of the machine learning application and an indication of a cluster of scoring containers that provides scoring functionality for the machine learning application.

3. The method of claim 1, wherein the configuration object is obtained from a data storage component.

4. The method of claim 1, further comprising:

obtaining, during a startup of the router component, configuration objects for a plurality of machine learning applications; and instantiating router instances for the plurality of machine learning applications based on the configuration objects for the plurality of machine learning applications before receiving any scoring requests associated with the plurality of machine learning applications.

5. The method of claim 1, wherein the router instance for the machine learning application is configured to receive a scoring result corresponding to the scoring request from the scoring container, generate a scoring response corresponding to the scoring request based on the scoring result, and send the scoring response corresponding to the scoring request to the machine learning application.

6. A non-transitory machine-readable storage medium that provides instructions that, if executed by one or more processors of one or more electronic devices implementing a router component in a multi-tenant on-demand serving infrastructure, are configurable to cause said router component to perform operations for routing scoring requests to scoring containers, the operations comprising:

receiving a scoring request;

determining a machine learning application associated with the scoring request;

determining whether a router instance for the machine learning application exists in the router component, wherein the router component includes a plurality of router instances for a plurality of machine learning applications, with each of the plurality of router instances being a separate instantiation of an object-oriented programming class that is specifically configured to handle routing for a different one of the plurality of machine learning applications within the multi-tenant on-demand serving infrastructure;

responsive to a determination that the router instance for the machine learning application does not exist in the router component, obtaining a configuration object for the machine learning application and creating the router instance for the machine learning application based on instantiating an instance of the object-oriented programming class with properties obtained from the configuration object for the machine learning application; and invoking the router instance for the machine learning application to route the scoring request associated with the machine learning application to a scoring container that provides scoring functionality for the machine learning application.

7. The non-transitory machine-readable storage medium of claim 6, wherein the configuration object for the machine learning application includes a name of the machine learning application and an indication of a cluster of scoring containers that provides scoring functionality for the machine learning application.

8. The non-transitory machine-readable storage medium of claim 6, wherein the configuration object is obtained from a data storage component.

9. The non-transitory machine-readable storage medium of claim 6, wherein the operations further comprise:

obtaining, during a startup of the router component, configuration objects for a plurality of machine learning applications; and instantiating router instances for the plurality of machine learning applications based on the configuration objects for the plurality of machine learning applications before receiving any scoring requests associated with the plurality of machine learning applications.

10. The non-transitory machine-readable storage medium of claim 6, wherein the router instance for the machine learning application is configured to receive a scoring result corresponding to the scoring request from the scoring container, generate a scoring response corresponding to the scoring request based on the scoring result, and send the scoring response corresponding to the scoring request to the machine learning application.

11. An apparatus comprising:

one or more processors; and a non-transitory machine-readable storage medium that provides instructions that, if executed by the one or more processors, are configurable to cause the apparatus to perform operations for routing scoring requests to scoring containers, the operations comprising:

receiving a scoring request;

determining a machine learning application associated with the scoring request; determining whether a router instance for the machine learning application exists in a router component in a multi-tenant on-demand serving infrastructure, wherein the router component includes a plurality of router instances for a plurality of machine learning applications, with each of the plurality of router instances being a separate instantiation of an object-oriented programming class that is specifically configured to handle routing for a different one of the plurality of machine learning applications within the multi-tenant on-demand serving infrastructure;

responsive to a determination that the router instance for the machine learning application does not exist in the router component, obtaining a configuration object for the machine learning application and creating the router instance for the machine learning application based on instantiating an instance of the object-oriented programming class with properties obtained from the configuration object for the machine learning application; and invoking the router instance for the machine learning application to route the scoring request associated with the machine learning application to a scoring container that provides scoring functionality for the machine learning application.

12. The apparatus of claim 11, wherein the configuration object for the machine learning application includes a name of the machine learning application and an indication of a cluster of scoring containers that provides scoring functionality for the machine learning application.

13. The apparatus of claim 11, wherein the configuration object is obtained from a data storage component.

14. The apparatus of claim 11, wherein the operations further comprise:

obtaining, during a startup of the router component, configuration objects for a plurality of machine learning applications; and instantiating router instances for the plurality of machine learning applications based on the configuration objects for the plurality of machine learning applications before receiving any scoring requests associated with the plurality of machine learning applications.

* * * * *